US011475895B2

(12) United States Patent
Ma et al.

(10) Patent No.: US 11,475,895 B2
(45) Date of Patent: Oct. 18, 2022

(54) CAPTION CUSTOMIZATION AND EDITING

(71) Applicant: Meta Platforms, Inc., Menlo Park, CA (US)

(72) Inventors: Shannon Ma, San Francisco, CA (US); Qikun Guo, Redwood City, CA (US); Martin Mroz, San Francisco, CA (US); Ryan Michael O'Rourke, San Francisco, CA (US); Aaron Williams, San Francisco, CA (US); Sharon Zeng, San Francisco, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 83 days.

(21) Appl. No.: 17/023,000

(22) Filed: Sep. 16, 2020

(65) Prior Publication Data
US 2022/0005477 A1 Jan. 6, 2022

Related U.S. Application Data

(60) Provisional application No. 62/705,582, filed on Jul. 6, 2020.

(51) Int. Cl.
G10L 15/26 (2006.01)
G06F 40/58 (2020.01)
G06F 40/284 (2020.01)
G06F 40/274 (2020.01)

(52) U.S. Cl.
CPC ............ *G10L 15/26* (2013.01); *G06F 40/274* (2020.01); *G06F 40/284* (2020.01); *G06F 40/58* (2020.01)

(58) Field of Classification Search
CPC .................. G10L 15/26; G06V 20/41
See application file for complete search history.

(56) References Cited

U.S. PATENT DOCUMENTS 7,540,009 B1    5/2009  Bryant et al.
9,405,741 B1 *  8/2016  Schaaf ................... G10L 15/08
11,190,735 B1 * 11/2021  Trim ...................... H04N 7/155
(Continued)

OTHER PUBLICATIONS

"Creating YouTube Captioning," Methods to Get Captions, Jun. 1, 2017, XP055855954, 15 pages, [Retrieved on Oct. 28, 2021], Retrieved from the Internet: https://web.archive.org/web/20191102135240if_/http://umanitoba.ca/student/accessibility/media/Creating-Captioning-using-YouTube.pdf.
(Continued)

*Primary Examiner* — Jialong He
(74) *Attorney, Agent, or Firm* — Lee & Hayes, P.C.

(57) ABSTRACT

Techniques are described that enable a user to edit and customize captions generated by a social networking system, such as transcriptions of an audio clip. In some cases, a social networking system receives, from a first user account, a video and an audio clip associated with the video, and determines that the audio clip contains speech. The social networking system may leverage a speech-to-text component to generate a first text caption based at least in part on the speech in the audio clip. The social networking system provides the first text caption to the first user account, and receives a user input to modify a word included in the first text caption. The social networking system generates a second text caption based at least in part on the user input, and provides the video, including the second text caption, to a second user account.

20 Claims, 7 Drawing Sheets

(56) References Cited

U.S. PATENT DOCUMENTS

| | | | |
|---|---|---|---|
| 2008/0134282 A1* | 6/2008 | Fridman | G06Q 10/10 |
| | | | 726/1 |
| 2009/0089828 A1* | 4/2009 | Carlsgaard | H04N 21/4318 |
| | | | 725/28 |
| 2011/0093263 A1* | 4/2011 | Mowzoon | G10L 15/26 |
| | | | 704/235 |
| 2011/0161999 A1 | 6/2011 | Klappert et al. | |
| 2012/0331517 A1* | 12/2012 | Wilcox | G06F 40/279 |
| | | | 726/1 |
| 2017/0011740 A1* | 1/2017 | Gauci | G06F 40/169 |
| 2017/0272818 A1 | 9/2017 | Gattis et al. | |
| 2020/0092607 A1* | 3/2020 | Rechner | H04N 21/234336 |
| 2020/0321007 A1* | 10/2020 | Stoker | H04N 7/155 |

OTHER PUBLICATIONS

Extended European Search Report for European Application No. 21174465.1, dated Nov. 5, 2021, 9 pages.

"YouTube Censoring Swears in Auto-Generated Subtitles?" Dec. 31, 2018, XP055855980, [Retrieved on Oct. 28, 2021], 1 page, Retrieved from the Internet: https://www.reddit.com/r/youtube/comments/8od4iq/youtube_censoring_swears_in_autogenerated/.

"YouTube Now Lets You Correct Automatic Captions," Aug. 15, 2012, XP055855562, [Retrieved on Oct. 27, 2021], 2 pages, Retrieved from the Internet: https://web.archive.org/web/20120818064009/https://mediaaccess.org.au/latest_news/captions/youtube-now-lets-you-correct-automatic-captions.

\* cited by examiner

CAPTION CUSTOMIZATION AND EDITING

This application claims the benefit of priority to U.S. Provisional Application No. 62/705,582, filed Jul. 6, 2020, which is incorporated herein by reference.

BACKGROUND

Social networking systems allow users to connect with each other by, for example, sharing content such as photos, audio, and/or videos with one another. Some social networking systems allow users to add captions to content items, where a caption may then be shared with other users as part of a content item. However, conventional systems that provide captions are not without limitations.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
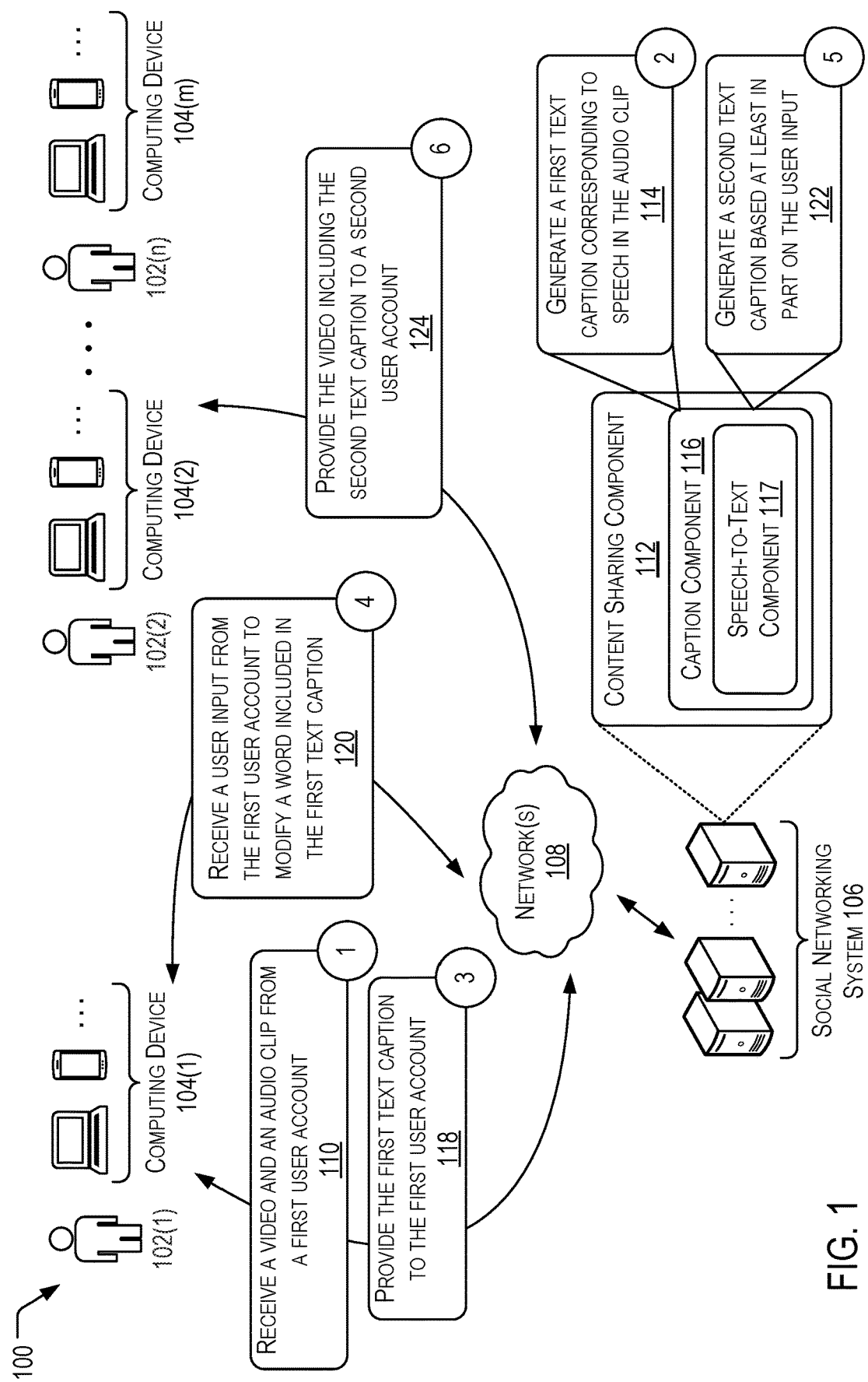
FIG. 1 is a schematic view of an example system usable to implement example techniques for caption customization and editing described herein.

As discussed above, social networking systems allow users to connect with each other by, for example, sharing content such as photos, audio, and videos with one another. In some cases, a social networking system may enable a user to include a caption in an item of content, where the caption comprises text associated with audio or visual content. The social networking system may, in some examples, automatically generate captions that correspond to speech included in an audio clip (e.g., as part of a video) provided by a user.

A caption generated by the social networking system may be displayed together with the audio and/or video content provided by the user, such that the words included in the caption generally correspond to the speech in the audio clip. However, conventional systems that provide captions are not without limitations. For example, users of conventional systems are not provided with techniques for editing automatically-generated captions, such as to correct a word that was misidentified by the system, to adjust timing of the words displayed in the caption, or to censor undesired words from appearing in the caption and/or in the audio clip. Therefore, users may be discouraged from using such captioning functionalities when sharing content on a social networking system.

This application describes techniques for providing caption customization and editing functionality via a social networking system and/or service (herein referred to as a "social networking system"). Various examples of the present disclosure include systems, methods, and non-transitory computer-readable media of a social networking system.

For instance, in one example, a social networking system may operate a service that corresponds to a dedicated application installed on a user device. The social networking system may enable users to share content via the application installed on the user device. In some cases, the shared content may be accessed (e.g., viewed) by devices associated with other users that also have the application installed on their respective devices. Alternatively or additionally, the social networking system may enable users to share content, and/or access (e.g., view) content shared by other user accounts, via a web-based application accessed via a web browser. The social networking system may store account information associated with each user and the respective device on which the application is installed and/or via which the social networking system is accessed.

In some examples, the social networking system may receive, from a first user account on a social networking system, a video and an audio clip associated with the video. In some cases, the video and the audio clip are captured together (e.g., at the same or substantially same time) by a computing device. The social networking system determines that the audio clip contains speech, and generates, by a speech-to-text component and based at least in part on the speech in the audio clip, a first text caption corresponding to the speech. The social networking system then provides the first text caption to the first user account, such as to allow a user associated with the first user account to edit and/or customize the first text caption. In examples, the social networking system receives, from the first user account, a user input to modify a portion of the first text caption, such as a word or words included in the first text caption. In examples, a user input to modify a portion of the caption may include (but is not limited to) changing a spelling of a word (e.g., a letter, character, etc.) included in the first text caption, changing from one word included by the first text caption to a different word or words desired by the user, changing a font and/or color of the word included in the first text caption (and/or multiple words included in the caption), changing a background color in a space surrounding the word in the first text caption (and/or multiple words included in the caption), confirming replacement of a word excluded from being included in automatically-generated text captions by the social networking system with a text string that is different from a spelling of the word spoken in the audio clip, and the like. The social networking system generates a second text caption based at least in part on the user input, and provides the video, including the second text caption, to a second user account on the social networking system.

In some examples, generating the first text caption comprises generating, by the speech-to-text component, a translation of the speech from the audio clip. The social networking system may further determine that a word included in the translation is excluded from being output in automatically-generated text captions by the social networking system, such as profanity, hate speech, bullying, racial or ethnic slurs, and so forth. The social networking system replaces the word in the translation with a text string that is different from the text spelling of the word. The social networking system provides the first text caption to the first user account with the text string that is different from the text spelling of the word. In this way, the social networking system may discourage sharing of offensive content, while still allowing the user to edit the caption (e.g., by changing characters included in the text string) as desired.

In some examples, the user input to modify the word included in the first text caption comprises a confirmation to replace the word in the first text caption with the text string that is different from the text spelling of the word. In other words, the user input may confirm the social networking system replacing a profane word with a text string that obscures the spelling of the profane word, such that the text string appears to the second user account in place of the spelling of the profane word.

In some examples, the social networking system determines a time at which the word is spoken in the audio clip. The social networking system may determine a portion of a frame (e.g., an area of the frame) of the video depicting a mouth of a person (e.g., a speaker in the video) at the time at which the word is spoken in the audio clip. In some cases, the social networking system obscures the portion of the frame of the video depicting the mouth of the person at the time at which the word is spoken in the audio clip, such as by blurring, pixelating, overlaying an opaque shape (e.g., a black rectangle), and the like. In this way, a word that is excluded from being included in automatically-generated text captions by the social networking system may also be obscured in the video to further prevent sharing of the excluded word on the social networking system.

In some examples, the social networking system may also alter audio in the audio clip at the time at which the word is spoken to obscure the word in the audio clip, and then provide the audio clip including the altered audio to the second user account with the video and the second text caption. For instance, the social networking system may replace the excluded word with "bleep," silence, or some other sound in the audio clip.

In some examples, the portion of the first text caption comprises a word, and the user input to modify the word causes a text character included in the word generated by the speech-to-text component to be changed. In some cases, the user may change a spelling of a word to be spelled differently than the translation generated by the speech-to-text component by changing one or more characters, may correct a word misidentified by the speech-to-text component, and the like.

In some examples, the portion of the first text caption comprises a word, and the user input causes at least one of a font of the word, a color of the word, or a background color in a space surrounding the word to be changed. For instance, the user may emphasize different parts of the caption using different formatting when the caption is displayed to the second user account.

In some examples, the portion of the first text caption comprises a first word, and the social networking system determines a first part of speech of the first word included in the first text caption (e.g., noun, verb, adjective, adverb, pronoun, preposition, conjunction, interjection, numeral, article, or determiner). The social networking system may determine a second part of speech of a second word included in the first text caption as well. In examples, the social networking system generates the second text caption such that the first word is displayed in a first format based at least in part on the first part of speech, and displays the second word in a second format that is different from the first format and based at least in part on the second part of speech. Accordingly, different words in the second text caption may be displayed to the second user account in different sizes based on corresponding parts of speech of the various words.

In some examples, the user input to modify the portion of the first text caption causes a timing of display of the portion in the second text caption to be changed relative to the video. Thus, the social networking system allows the user to configure timing of display of the words and/or sounds represented in the caption where timing may be important to the user, such as telling a joke, revealing an answer to a quiz, and the like.

In some examples, the portion is a first portion, and the social networking system generates a notification that includes at least a second portion of the second text caption that may include changes made by the user input. The social networking system may provide the notification to the second user account to notify the second user account of receipt of the video, such as on a lock screen, home screen, and/or overlaying a different application currently being used by a user associated with the second user account.

In some examples, the first text caption overlays the video at a time period corresponding to the speech in the video when the first text caption is provided to the first user account, such as to give a user associated with the first user account a preview of what text will appear as the video progresses. Alternatively or additionally, the second text caption may overlay the video at the time period corresponding to the speech in the video when the second text caption (e.g., as edited by the user input) is provided to the second user account. In this way, the caption may correspond to what is being said in the video and based on the audio that the first user account provided with the video.

In this way, the social networking system provides users with the ability to edit and customize captions that are automatically generated by the social networking system. For instance, the social networking system enables users to make edits to automatically-generated captions such as changing a spelling of a word (e.g., a letter, character, etc.) included in the automatically-generated caption, changing from one word in the automatically-generated caption to a different word desired by the user, changing a font and/or font color of the word included in the caption (and/or multiple words included in the caption), changing a background color in a space surrounding the word in the caption (and/or multiple words included in the caption), changing a time at which a word in the caption is displayed, changing a duration of time that the word is displayed, and the like. Furthermore, the social networking system simplifies obscuring words, such as offensive words or profanity, in video, audio, and/or captions included in a content item prior to sharing a content item with other users on the social networking system.

These and other aspects are described further below with reference to the accompanying drawings. The drawings are merely example implementations and should not be construed to limit the scope of the claims. For example, while examples are illustrated in the context of a user interface for a mobile device, the techniques may be implemented using any computing device and the user interface may be adapted to the size, shape, and configuration of the particular computing device.

Example System Architecture

FIG. 1 is a schematic view of an example computing system 100 usable to implement example techniques described herein to facilitate social network collections on an application via the system 100. In some examples, the system 100 may include users 102(1), 102(2), ... 102(n)

(collectively "users 102") to interact using computing devices 104(1), 104(2), ... 104(m) (collectively "computing devices 104") with a social networking system 106 via a network 108. In this example, n and m are non-zero integers greater than 1.

Each of the computing devices 104 includes one or more processors and memory storing computer executable instructions to implement the functionality discussed herein attributable to the various computing devices. In some examples, the computing devices 104 may include desktop computers, laptop computers, tablet computers, mobile devices (e.g., smart phones or other cellular or mobile phones, mobile gaming devices, portable media devices, etc.), or other suitable computing devices. The computing devices 104 may execute one or more client applications, such as a web browser (e.g., Microsoft Windows Internet Explorer, Mozilla Firefox, Apple Safari, Google Chrome, Opera, etc.) and/or a native or special-purpose client application (e.g., social media applications, messaging applications, email applications, games, etc.), to access and view content over the network 108.

The network 108 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which the computing devices 104 may access the social networking system 106 and/or communicate with one another.

The social networking system 106 may include one or more servers or other computing devices, any or all of which may include one or more processors and memory storing computer executable instructions to implement the functionality discussed herein attributable to the social networking system or digital platform. The social networking system 106 may enable its users 102 (such as persons or organizations) to interact with the social networking system 106 and with each other via the computing devices 104. The social networking system 106 may, with input from a user, create and store in the social networking system 106 a user account associated with the user. The user account may include demographic information, communication-channel information, financial information and information on personal interests of the user. The social networking system 106 may also, with input from a user, create and store a record of relationships of the user with other users of the social networking system, as well as provide services (e.g., posts, comments, photo-sharing, messaging, tagging, mentioning of other users or entities, games, etc.) to facilitate social interaction between or among the users 102.

The social networking system 106 may be configured to facilitate customization and editing of captions included in content items shared between the users 102 via the computing devices 104.

For example, at operation 110 (indicated by "1"), a content sharing component 112 of the social networking system 106 may receive a video and an audio clip from a first user account associated with the user 102(1). In some examples, the content sharing component 112 may be part of a social network service (e.g., Threads®, Facebook®, Instagram®, Snapchat®, etc.), although other examples of services are also considered. In many of the examples described herein, the user 102(1) captures the video using a camera of the computing device 104(1), and the audio clip is captured by a microphone of the computing device 104(1) as the video is captured. However, other examples are also considered for obtaining video(s) and/or audio clip(s), such as retrieving a video and/or audio clip from a different computing device or storage (e.g., cloud storage), generating an animation to be used for the video, capturing an image using a camera of the computing device 104(1) in place of the video, capturing audio and/or video using a phone or video conferencing application, capturing audio using a microphone and/or voice recorder, and the like.

At operation 114 (indicated by "2"), a caption component 116 of the content sharing component 112 generates a first text caption corresponding to speech included in the audio clip. For example, the caption component 116 may comprise a speech-to-text component 117 configured to detect speech and/or other sounds in audio clips, and generate a transcription of words in the speech and/or other sounds detected in an audio clip. The caption component 116 may then generate a caption from the transcription, where the caption displays words in the transcription at a time at or near the time that corresponding words are spoken (or sounds appear) in the audio clip. In some examples, the caption component 116 may overlay the caption on a portion of the video, where the words displayed in the caption correspond to speech spoken in the video (and in the audio clip associated with the video) while the words are displayed (e.g., the text may be displayed substantially simultaneously or concurrently with the video and/or audio of the speaker saying the words).

At operation 118 (indicated by "3"), the caption component 116 provides the first text caption to the first user account associated with the user 102(1). In some cases, the caption component 116 provides the caption to the first user account as a "preview" of how the caption will appear with the video and/or the audio clip once shared on the social networking system 106 with another user account associated with one of the other users 102(2)-102(n). In this way, the user 102(1) can view the content item that includes the caption that was automatically generated by the caption component 116 with the video and/or audio clip to be shared with another user 102(2), prior to the complete content item being provided to the other user 102(2). The user 102(1) can review the words and/or text included in the automatically-generated caption, timing of the caption versus the video and/or audio clip, a location of the caption overlaying the video, and/or font, color, background, and the like of the caption prior to sharing the content item with the user 102(2).

At operation 120 (indicated by "4"), the caption component 116 receives a user input from the first user account to modify a word included in the first text caption. Modification of the word may take a variety of forms, such as (but not limited to) changing a spelling of a word (e.g., a letter, character, etc.) included in the automatically-generated caption, changing from one word included by the caption component 116 in the first caption to a different word or words desired by the user 102(1), changing a font and/or color of the word included in the caption (and/or multiple words included in the caption), changing a background color in a space surrounding the word in the caption (and/or multiple words included in the caption), and the like. In an illustrative example, the caption component 116 may receive a user input to change the word "yikes" in an automatically-generated caption to "YIIIKKESS," where the user 102(1) wants to emphasize the word in the caption using capital letters and an alternate spelling.

In some examples, the user input may modify a time at which the word in the caption is displayed relative to the video and/or the audio clip. The user input to modify the time at which the word in the caption is displayed may be independent of the video and/or the audio clip, such that the video and/or the audio clip remain unchanged despite the change in timing of the words displayed in the caption. For instance, the caption component 116 may receive a user input to delay displaying the word in the caption until after the word is spoken in the audio clip, such as to delay a punch line in a joke.

Additionally, in some cases, the caption component 116 may provide functionality to obscure words included in the caption, the video, and/or the audio clip. For instance, the social networking system 106 may exclude certain words (e.g., profanity, hate speech, bullying, racial or ethnic slurs, etc.) from being shared between the users 102 in some scenarios. In some examples, the caption component 116 may determine that a word included in the first text caption (and/or the translation of the speech in the audio clip) includes a word that is excluded from being output in automatically-generated text captions by the social networking system 106. For example, the caption component 116 may compare a word or words included in the first text caption to a list of words and/or phrases determined by the social networking system 106 to be offensive or otherwise prohibited, words and/or phrases that have received greater than a threshold number (e.g., 50, 100, 1,000, etc.) of takedown requests, and so forth. Alternatively or additionally, the caption component 116 may use one or more machine learning models to determine a semantic meaning of words in a caption to determine offensiveness, and exclude a word or words based on the semantic meaning determined by such models.

Based on this determination, the caption component 116 may replace the word in the first text caption with a text string that is different from the text spelling of the word translated from the speech in the audio clip. In an illustrative example, the caption component 116 may determine that the first text caption includes a four-letter profanity word, and thus may replace the four-letter profanity word with a text string such as "#$%&", "**", or the like. The caption component 116 may then provide the first text caption that includes the text string that is different from the text spelling of the excluded word to the first user account associated with the user 102(1)** for review, editing, customization, and so forth.

In examples in which the caption component 116 provides a text string as part of a caption to the first user account to replace a word excluded from being output in automatically-generated text captions, the user input to modify the word may comprise a confirmation to replace the word with the text string that is different from the text spelling of the word. For example, the caption component 116 may provide a text string such as "#$%&" in the first text caption to replace a word determined by the caption component 116 to be a profane word, similar to the discussion above. The caption component 116 may receive a user input selection to confirm replacing the text spelling of the word in the first text caption with the "#$%&" text string. Examples are also considered in which the user input to modify the text string supplied in the first text caption that replaced the text spelling of the excluded word causes the text string to revert back to the text spelling of the excluded word (e.g., a rejection of the suggested word replacement), be replaced with a different text string or different word altogether, and the like.

Additionally, in some cases, the video supplied by the first user account in the operation 110 may be modified in response to receiving the confirmation to include the text string to replace the text spelling of the excluded word. Modifying the video may include blurring a mouth of a speaker in the video so that the excluded word is further obscured and less likely to be deciphered by a viewer of the video. For instance, the caption component 116 may determine a time (e.g., a time period) in the audio clip at which the excluded word is spoken. The caption component 116 may then select a frame in the video at or near the time in the audio clip at which the excluded word is spoken. In examples, the caption component 116 may determine whether a face, and specifically a mouth of a face, is depicted in the frame (e.g., using facial recognition techniques). If a mouth of a face is depicted in the frame, the caption component 116 may obscure a portion of the frame at the location the mouth (and/or surrounding the mouth) to prevent deciphering of the excluded word, such as by blurring, pixelating, overlaying an opaque shape (e.g., a black rectangle), and the like. Alternatively or additionally, the caption component 116 may alter audio in the audio clip at the time at which the excluded word is spoken to further prevent the excluded word from being shared between the users 102. For instance, the caption component 116 may replace the excluded word with "bleep," silence, or some other sound in the audio clip.

In some examples, the user input to modify the word included in the first caption may include changing a text string provided in the first caption to replace an excluded word with different text. For instance, the caption component 116 may misidentify a word spoken in the audio clip as being a word that is excluded from being included in automatically-generated text captions, when in fact the word is not excluded. The caption component 116 may receive a user input to change the text string included in the first caption that replaced the word with text of another word. Upon receiving a user input to remove and/or modify the text string included in the first caption that replaced the word, the caption component 116 may revert modifications to obscure portions of the frames of the video at the time at which the word was spoken in the audio clip, such that the video supplied by the user 102(1) is displayed without such modification. Alternatively or additionally, the caption component 116 may revert modifications to obscure the audio at the time at which the word was spoken in the audio clip, such that the audio clip supplied by the user 102(1) is output without such modification. This gives the user 102(1) the ability to, for example, correct misidentified words that the caption component 116 determined to be excluded from automatically-generated captions, such that the speech in the audio clip is accurately reflected in the caption.

At operation 122 (indicated by "5"), the caption component 116 generates a second text caption based at least in part on the user input. In examples, the second text caption includes modifications to the word in the caption such as changing text characters in the word, replacing the word, removing the word, adding the word, confirming replacement of the word by the caption component 116 with a different text string (as described above), changing a time at which the word is displayed in relation to the video and/or audio clip, changing a font of the word, changing a background color in an area surrounding the word, and so forth. In some cases, the caption component 116 causes the second text caption to overlay the video at the time period corresponding to the speech in the video, and/or at a time designated by the user input (e.g., to delay displaying a word in the caption to deliver a punchline of a joke at a particular time).

In some examples, the caption component 116 may generate the second text caption with words included in the caption having different formats and/or sizes, such as to emphasize particular words or phrases in the caption. Additionally, examples are considered in which the caption component 116 generates the first text caption to be presented to the first user 102(1) for review, customization, editing, and so on with varying sizes as well, to provide the user 102(1) with an accurate preview of the content item that includes the video, audio clip, and/or the caption prior to sharing with the other users 102(2)-102(n). The caption component 116 may determine a size for one or more words included in the caption based on a part of speech of a word (e.g., noun, verb, adjective, adverb, pronoun, preposition, conjunction, interjection, numeral, article, or determiner), a length of the word, a size of the caption, a number of words included in the caption, semantics of the caption, a relative importance of the word within the semantics of the caption to other word(s) included in the caption, and the like.

For example, the caption component 116 may determine a part of speech of a first word included in the caption, and a part of speech of a second word included in the caption. The caption component 116 may then generate the caption such that the first word is displayed in a first format (e.g., size) based on the part of speech associated with the first word. The caption component 116 may also generate the caption such that the second word is displayed in a second format (e.g., size) that is different from the first size and based, in part, on the second part of speech associated with the second word. While size is used as an illustrative example herein, other formats are also considered that the caption component 116 may alter for different words included in a caption, such as, for example, font, color, and/or emphasis (e.g., bold, underline, italic, etc.). In some examples, the caption component 116 may emphasize words in the caption based on words that the user 102(1) emphasizes in the speech, such as by displaying words spoken at a louder volume in a larger text size and words spoken at a softer volume in a smaller text size.

In an illustrative example, the caption component 116 may determine that a first word is the only verb included in a sentence of the caption, and a second word is a pronoun included in the sentence of the caption. The caption component 116 may cause the first word, the verb, to be displayed at a larger size (e.g., size 16 font) and the second word, the pronoun, to be displayed at a smaller size (e.g., size 12 font). In some cases, the caption component 116 may associated words proximate to the first word and/or the second word in the caption to be a same size as the first word or the second word. For instance, the caption component 116 may cause an adverb adjacent to the verb in the caption from the example above to also be displayed at the larger size to fill a line of the caption. Alternatively or additionally, the caption component 116 may cause a conjunction and an adjective adjacent the pronoun in the caption from the example above to also be displayed at the smaller size to fill a line of the caption.

At operation 124 (indicated by "6"), the content sharing component 112 provides the video including the second text caption to a second user account of the social networking system 106. In some examples, the content sharing component 112 may also provide the audio associated with the video and second text caption, while in other examples the audio may be omitted. For example, the content sharing component 112 may deliver a content item that includes the video, the second text caption, and in some examples the audio clip to an inbox of the second user account associated with the user 102(2) as a direct message from the first user account of the user 102(1). In some cases, the content sharing component 112 may deliver the content item to inboxes of user accounts associated with multiple other users 102(2)-102(n) as direct messages. Alternatively or additionally, the content sharing component 112 may provide the content item to the other users 102(2)-102(n) as feed media, such that the content item appears in a feed of content posts that the other users 102(2)-102(n) follow on the social networking system 106. Further, in some cases, the content sharing component 112 may provide the content item to the other users 102(2)-102(n) as an ephemeral content item that is viewable for a limited duration.

In some examples, in addition to providing the content item, the content sharing component 112 may also generate a notification to notify the user 102(2) that a content item has been shared with the user 102(2) by the user 102(1). For instance, the user 102(1) may direct the content item that includes the video, the second text caption, and the audio clip to be delivered as a direct message to an inbox of a user account associated with the user 102(2). In response, the content sharing component 112 may generate a notification to be delivered with the content item, where the notification includes at least a portion of the second text caption as a preview to the user 102(2) of what is included in the content item. In examples, the notification provided by the content sharing component 112 includes an instruction to display the notification independently of a social network application on the computing device 104(1) and associated with the social networking system 106. For instance, the instruction may cause the notification to be displayed on a lock screen of the computing device 104(1), as an overlay to a home screen of the computing device 104(1), as an overlay to an application other than the social network application on the computing device 104(1), and so forth.

In some examples, the social networking system 106 may provide privacy features to the users 102 while interacting with the social networking system 106. In particular examples, one or more objects (e.g., content or other types of objects) of the computing system 100 may be associated with one or more privacy settings. The one or more objects may be stored on or otherwise associated with any suitable computing system or application, such as, for example, the social networking system 106, a client system, a third-party system, a social networking application, a messaging application, a photo-sharing application, or any other suitable computing system or application. Although the examples discussed herein are in the context of an online social network, these privacy settings may be applied to any other suitable computing system. Privacy settings (or "access settings") for an object or item of content may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular examples, privacy settings for an object may specify a "blocked list" and/or a "restricted list" of users or other entities that should not be allowed to access certain information associated with the object. In particular examples, the blocked list may include third-party entities. The blocked list or restricted list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular examples, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node corresponding to a particular photo may have a privacy setting specifying that the photo may be accessed only by users tagged in the photo and friends of the users tagged in the photo. In particular examples, privacy settings may allow users to opt in to or opt out of having their content, information, or actions stored/logged by the social-networking system or shared with other systems (e.g., a third-party system). Although this disclosure describes using particular privacy settings in a particular manner, this disclosure contemplates using any suitable privacy settings in any suitable manner.

In particular examples, privacy settings may be based on one or more nodes or edges of a social graph. A privacy setting may be specified for one or more edges or edge-types of the social graph, or with respect to one or more nodes or node-types of the social graph. The privacy settings applied to a particular edge connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a user 102(1) may share an object to the social networking system 106. The object may be associated with a concept node connected to a user node of the user 102(1) by an edge. The user 102(1) may specify privacy settings that apply to a particular edge connecting to the concept node of the object, or may specify privacy settings that apply to all edges connecting to the concept node. In some examples, the user 102(1) may share a set of objects of a particular object-type (e.g., a set of images). The user 102(1) may specify privacy settings with respect to all objects associated with the user 102(1) of that particular object-type as having a particular privacy setting (e.g., specifying that all images posted by the user 102(1) are visible only to friends of the user and/or users tagged in the images).

In particular examples, the social networking system 106 may present a "privacy wizard" (e.g., within a webpage, a module, one or more dialog boxes, or any other suitable interface) to the user 102(1) to assist the user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular examples, the social networking system 106 may offer a "dashboard" functionality to the user 102(1) that may display, to the user 102(1), current privacy settings of the user 102(1). The dashboard functionality may be displayed to the user 102(1) at any appropriate time (e.g., following an input from the user 102(1) summoning the dashboard functionality, following the occurrence of a particular event or trigger action). The dashboard functionality may allow the user 102(1) to modify one or more of the user's current privacy settings at any time, in any suitable manner (e.g., redirecting the user 102(1) to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular examples, one or more servers of the social networking system 106 may be authorization/privacy servers for enforcing privacy settings. In response to a request from the user 102(1) (or other entity) for a particular object stored in a data store, the social networking system 106 may send a request to the data store for the object. The request may identify the user 102(1) associated with the request and the object may be sent only to the user 102(1) (or a client system of the user) if the authorization server determines that the user 102(1) is authorized to access the object based on the privacy settings associated with the object. If the requesting user is not authorized to access the object, the authorization server may prevent the requested object from being retrieved from the data store or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular examples, an object may represent content that is visible to a user through a newsfeed of the user. As an example and not by way of limitation, one or more objects may be visible to a user's "Trending" page. In particular examples, an object may correspond to a particular user. The object may be content associated with the particular user, or may be the particular user's account or information stored on the social networking system 106, or other computing system. As an example and not by way of limitation, the user 102(1) may view one or more other users 102(2) . . . 102(n) of an online social network through a "People You May Know" function of the online social network, or by viewing a list of friends of the user 102(1). As an example and not by way of limitation, the user 102(1) may specify that they do not wish to see objects associated with a particular other user (e.g., the user 102(2)) in their newsfeed or friends list. If the privacy settings for the object do not allow it to be surfaced to, discovered by, or visible to the user 102(1), the object may be excluded from the search results. Although this disclosure describes enforcing privacy settings in a particular manner, this disclosure contemplates enforcing privacy settings in any suitable manner.

In particular examples, different objects of the same type associated with a user may have different privacy settings. Different types of objects associated with a user may also have different types of privacy settings. As an example and not by way of limitation, the user 102(1) may specify that the user's status updates are public, but any images shared by the user are visible only to the user's friends on the online social network. In some examples, the user 102(1) may specify different privacy settings for different types of entities, such as individual users, friends-of-friends, followers, user groups, or corporate entities. In some examples, the user 102(1) may specify a group of users that may view videos posted by the user 102(1), while keeping the videos from being visible to the user's employer. In particular examples, different privacy settings may be provided for different user groups or user demographics. As an example and not by way of limitation, the user 102(1) may specify that other users who attend the same university as the user 102(1) may view the user's pictures, but that other users who are family members of the user 102(1) may not view those same pictures.

In particular examples, the social networking system 106 may provide one or more default privacy settings for each object of a particular object-type. A privacy setting for an object that is set to a default may be changed by a user associated with that object. As an example and not by way of limitation, all images posted by the user 102(1) may have a default privacy setting of being visible only to friends of the first user and, for a particular image, the user 102(1) may change the privacy setting for the image to be visible to friends and friends-of-friends.

In particular examples, privacy settings may allow the user 102(1) to specify (e.g., by opting out, by not opting in) whether the social networking system 106 may receive, collect, log, or store particular objects or information associated with the user 102(1) for any purpose. In particular examples, privacy settings may allow the user 102(1) to specify whether particular applications or processes may access, store, or use particular objects or information associated with the user. The privacy settings may allow the user 102(1) to opt in or opt out of having objects or information accessed, stored, or used by specific applications or processes. The social networking system 106 may access such information in order to provide a particular function or service to the user 102(1), without the social networking system 106 having access to that information for any other purposes. Before accessing, storing, or using such objects or information, the social networking system 106 may prompt the user 102(1) to provide privacy settings specifying which applications or processes, if any, may access, store, or use the object or information prior to allowing any such action. As an example and not by way of limitation, the user 102(1) may transmit a message to the user 102(2) via an application related to the online social network (e.g., a messaging app), and may specify privacy settings that such messages should not be stored by the social networking system 106.

In particular examples, the user 102(1) may specify whether particular types of objects or information associated with the user 102(1) may be accessed, stored, or used by the social networking system 106. As an example and not by way of limitation, the user 102(1) may specify that images sent by the user 102(1) through the social networking system 106 may not be stored by the social networking system 106. In some examples, the user 102(1) may specify that messages sent from the user 102(1) to another user 102(2) may not be stored by the social networking system 106. In some cases, the user 102(1) may specify that all objects sent via a particular application may be saved by the social networking system 106.

In particular examples, privacy settings may allow the user 102(1) to specify whether particular objects or information associated with the user 102(1) may be accessed from particular client systems or third-party systems. The privacy settings may allow the user 102(1) to opt in or opt out of having objects or information accessed from a particular device (e.g., the phone book on a user's smart phone), from a particular application (e.g., a messaging app), or from a particular system (e.g., an email server). The social networking system 106 may provide default privacy settings with respect to each device, system, or application, and/or the user 102(1) may be prompted to specify a particular privacy setting for each context. As an example and not by way of limitation, the user 102(1) may utilize a location-services feature of the social networking system 106 to provide recommendations for restaurants or other places in proximity to the user 102(1). The default privacy settings of the user 102(1) may specify that the social networking system 106 may use location information provided from the computing device 104(1) of the user 102(1) to provide the location-based services, but that the social networking system 106 may not store the location information of the user 102(1) or provide it to any third-party system. The user 102(1) may then update the privacy settings to allow location information to be used by a third-party image-sharing application in order to geo-tag photos.

In particular examples, privacy settings may allow a user to engage in the ephemeral sharing of objects on the online social network. Ephemeral sharing refers to the sharing of objects (e.g., posts, photos) or information for a finite period of time. Access or denial of access to the objects or information may be specified by time or date. As an example and not by way of limitation, a user may specify that a particular image uploaded by the user is visible to the user's friends for the next week, after which time the image may no longer be accessible to other users. In some examples, a company may post content related to a product release ahead of the official launch, and specify that the content may not be visible to other users until after the product launch.

In particular examples, for particular objects or information having privacy settings specifying that they are ephemeral, the social networking system 106 may be restricted in its access, storage, or use of the objects or information. The social networking system 106 may temporarily access, store, or use these particular objects or information in order to facilitate particular actions of a user associated with the objects or information, and may subsequently delete the objects or information, as specified by the respective privacy settings. As an example and not by way of limitation, the user 102(1) may transmit a message to the user 102(2), and the social networking system 106 may temporarily store the message in a data store until the user 102(2) has viewed or downloaded the message, at which point the social networking system 106 may delete the message from the data store. In some examples, continuing with the prior example, the message may be stored for a specified period of time (e.g., 2 weeks), after which point the social networking system 106 may delete the message from the data store.

In particular examples, changes to privacy settings may take effect retroactively, affecting the visibility of objects and content shared prior to the change. As an example and not by way of limitation, the user 102(1) may share a first image and specify that the first image is to be public to all other users. At a later time, the user 102(1) may specify that any images shared by the user 102(1) should be made visible only to a first user group. The social networking system 106 may determine that this privacy setting also applies to the first image and make the first image visible only to the first user group. In particular examples, the change in privacy settings may take effect only going forward. Continuing the example above, if the user 102(1) changes privacy settings and then shares a second image, the second image may be visible only to the first user group, but the first image may remain visible to all users. In particular examples, in response to a user action to change a privacy setting, the social networking system 106 may further prompt the user to indicate whether the user wants to apply the changes to the privacy setting retroactively. In particular examples, a user change to privacy settings may be a one-off change specific to one object. In particular examples, a user change to privacy may be a global change for all objects associated with the user.

In particular examples, the social networking system 106 may determine that user 102(1) may want to change one or more privacy settings in response to a trigger action associated with the user 102(1). The trigger action may be any suitable action on the online social network. As an example and not by way of limitation, a trigger action may be a change in the relationship between a first and second user of the online social network (e.g., "un-friending" a user, changing the relationship status between the users, etc.). In particular examples, upon determining that a trigger action has occurred, the social networking system 106 may prompt the user 102(1) to change the privacy settings regarding the visibility of objects associated with the user 102(1). The prompt may redirect the user 102(1) to a workflow process for editing privacy settings with respect to one or more entities associated with the trigger action. The privacy settings associated with the user 102(1) may be changed only in response to an explicit input from the user 102(1), and may not be changed without the approval of the user 102(1). As an example and not by way of limitation, the workflow process may include providing the user 102(1) with the current privacy settings with respect to the user 102(2) or to a group of users (e.g., un-tagging the user 102(1) or the user 102(2) from particular objects, changing the visibility of particular objects with respect to the user 102(2) or a group of users), and receiving an indication from the user 102(1) to change the privacy settings based on any of the methods described herein, or to keep the existing privacy settings.

In particular examples, a user may need to provide verification of a privacy setting before allowing the user to perform particular actions on the online social network, or to provide verification before changing a particular privacy setting. When performing particular actions or changing a particular privacy setting, a prompt may be presented to the user to remind the user of his or her current privacy settings and to ask the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (i.e., "public"). However, if the user changes his or her relationship status, the social networking system 106 may determine that such action may be sensitive and may prompt the user to confirm that his or her relationship status should remain public before proceeding. In some examples, a user's privacy settings may specify that the user's posts are visible only to friends of the user. However, if the user changes the privacy setting for his or her posts to being public, the social networking system 106 may prompt the user with a reminder of the user's current privacy settings of posts being visible only to friends, and a warning that this change will make all of the user's past posts visible to the public. The user may then be required to provide a second verification, input authentication credentials, or provide other types of verification before proceeding with the change in privacy settings. In particular examples, a user may need to provide verification of a privacy setting on a periodic basis. A prompt or reminder may be periodically sent to the user based either on time elapsed or a number of user actions. As an example and not by way of limitation, the social networking system 106 may send a reminder to the user to confirm his or her privacy settings every six months or after every ten photo posts. In particular examples, privacy settings may also allow users to control access to the objects or information on a per-request basis. As an example and not by way of limitation, the social networking system 106 may notify the user whenever a third-party system attempts to access information associated with the user, and require the user to provide verification that access should be allowed before proceeding.

Figure 2C:
FIGS. 2A-2C depict example user interfaces that are usable to edit and customize captions using the techniques described herein.
Figure 2B:
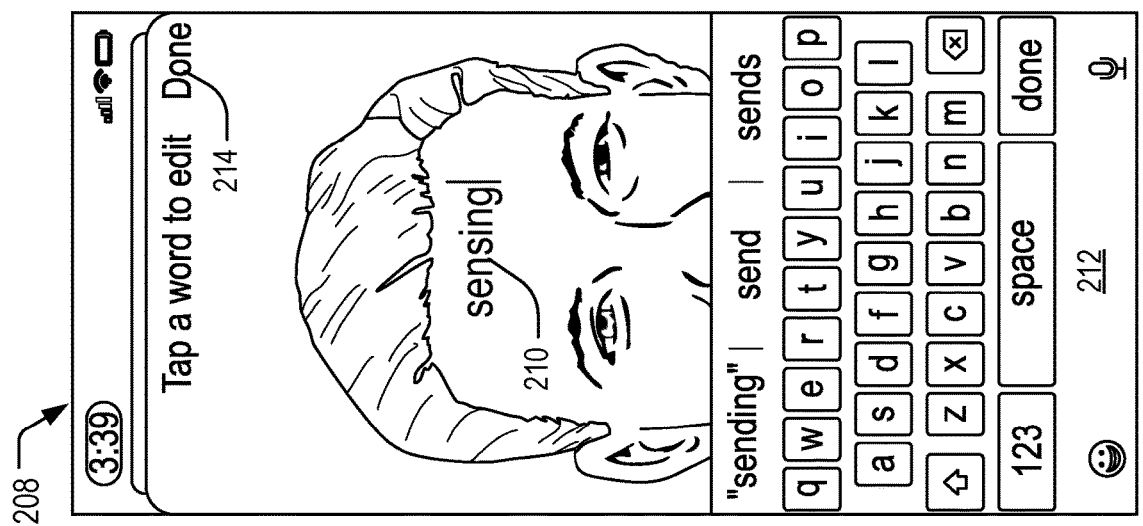
Figure 2A:
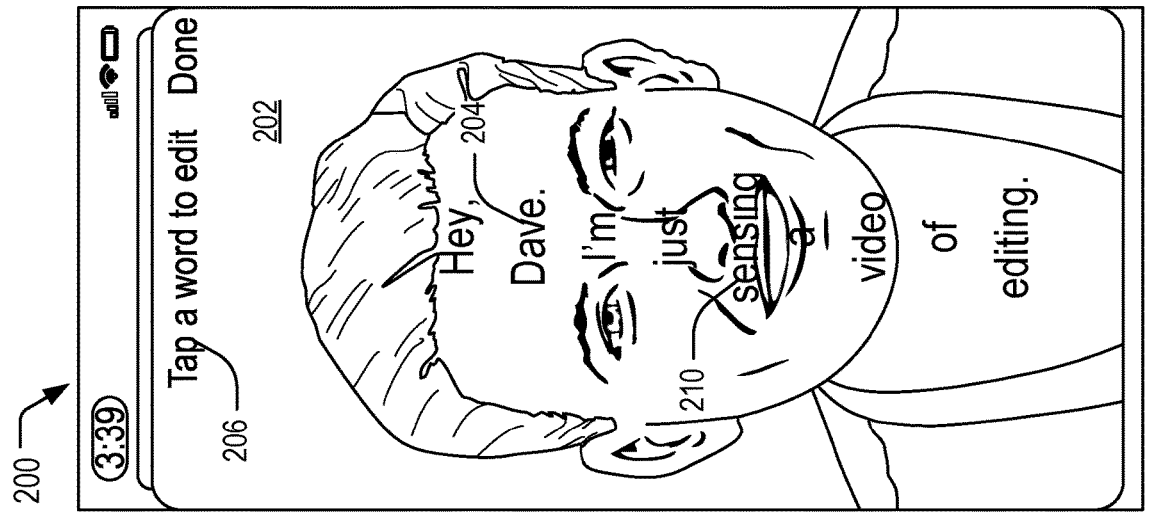

FIGS. 2A-2C depict example user interfaces that are usable to edit and customize captions using the techniques described herein. For example, a user interface 200 illustrated in FIG. 2A may be presented to the user 102(1) via the computing device 104(1) following the operation 118 of FIG. 1, in which the caption component 116 provides the user 102(1) with the first text caption for editing and customization. The user interface 200 may include a frame 202 of the video that was previously provided by the user 102(1). The user interface 200 may also include a first text caption 204 generated by the caption component 116 and corresponding to speech detected in an audio clip provided by the user 102(1) with the video. The first text caption 204 may overlay on the frame 202 of the video in the user interface 200, providing a preview of what text will appear in the automatically-generated caption without customization or editing by the user 102(1). The user interface 200 may further include an instruction 206 on how to begin editing or customizing the first text caption 204 that was automatically generated by the caption component 116.

A user interface 208 illustrated in FIG. 2B may be presented to the user 102(1) via the computing device 104(1) in response to the selection of a word 210 (e.g., via a touch input) included in the first text caption 204 in the user interface 200. The user interface 208 may include the word 210 without the rest of the first text caption 204, so it is clear to the user 102(1) which portion of the caption the user 102(1) is currently editing or customizing. The user interface 208 may include a keyboard 212 to facilitate changing characters in the word 210, deleting the word 210, replacing the word 210 with a different word, and the like as desired by the user 102(1). Controls to modify the first text caption 204 are not limited to those shown in the user interface 208, and may include, for example, timing controls (e.g., to cause the word 210 to be displayed at a specific time relative to the video and/or the audio clip), font controls, background controls, and the like. As discussed above, user inputs supplied via the user interface 208 may cause the caption component 116 to generate a second text caption based in part on the user inputs, such as changing a character included in the word 210. In examples, the user interface 208 may include a control 214 that, when selected, causes a content item that includes the video supplied by the user 102(1), the second text caption that reflects the user inputs received at the user interface 208, and/or the audio clip to be provided to a second user account on the social networking system 106.

A user interface 216 illustrated in FIG. 2C may be presented to the user 102(2) via the computing device 104(2) in response to the selection of the control 214 (e.g., via a touch input) in the user interface 208. As shown, the user interface 216 may include a second text caption 218 which may include a word 220 that reflects a change made by the user 102(1) to the word 210. In the illustrated example, the user 102(1) changed the word 210 included in the automatically generated first text caption 204 from "sensing" to "sending," as shown by the word 220.

Additionally, the second text caption 218 may include different words displayed at different sizes, e.g., words in a first line 222 of the caption displayed at a first size, and words in a second line 224 of the caption displayed at a second size larger than the first size. The caption component 116 may cause the words in the second text caption 218 to be displayed at a particular size based on parts of speech of the words in the caption, lengths of the words in the caption, a size of the caption in the user interface 216, a number of words included in the caption, semantics of the caption, a relative importance of the word within the semantics of the caption to other word(s) included in the caption, and the like as described above.

Alternatively or additionally, an amount of text of the second text caption 218 displayed in the user interface 216 may be based on a rate of speech (e.g., number of words spoken per minute). For example, the caption component 116 may cause more text (e.g., 20 words) of the second text caption 218 to be displayed in the user interface 216 when the speaker is speaking at 200 words per minute in an audio clip than when the speaker is speaking at 150 words per minute in an audio clip (e.g., displaying 15 words). In some cases, the caption component 116 may alter the amount of text displayed in the second text caption 218 in the user interface 216 based on a volume of speech, pauses in speech, a fixed amount of text (e.g., 200 characters, 30 words, etc.) permitted in the user interface 216 at a time, and so forth. In some examples, the second text caption 218 may be positioned in the user interface 216 based on detected positions of different objects (e.g., a face) in the video, such as to avoid blocking a face, to appear in a dialog box from a mouth of a speaker in the video, and so on.

Figure 3B:
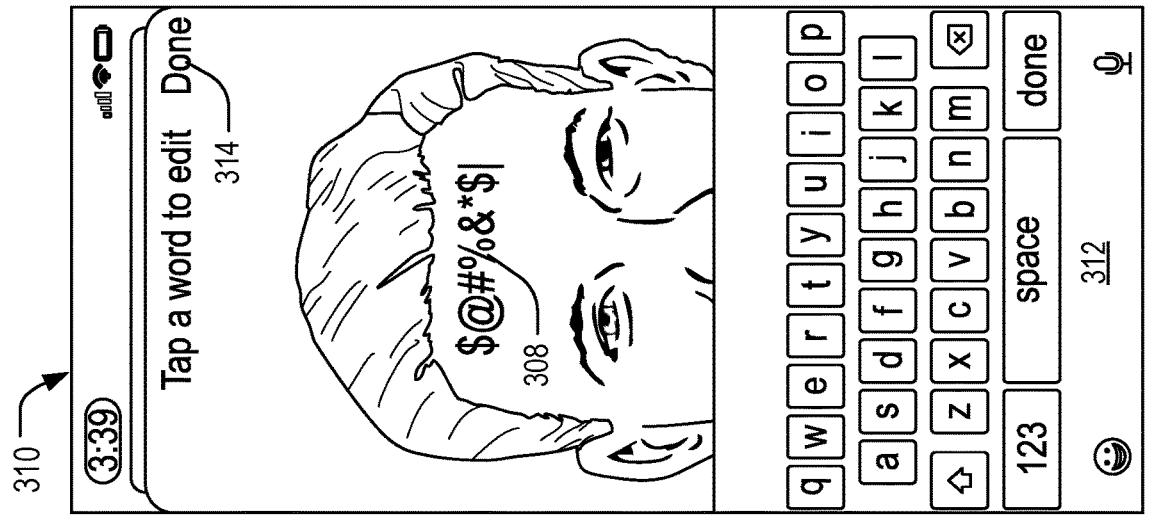
FIGS. 3A and 3B depict additional example user interfaces that are usable to edit and customize captions using the techniques described herein.
Figure 3A:
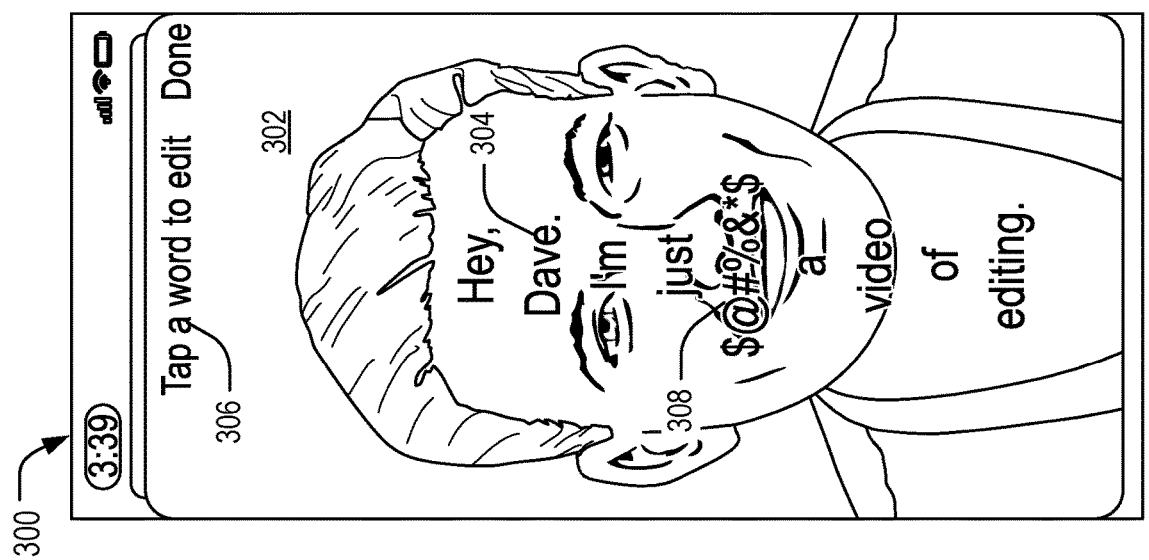

FIGS. 3A and 3B depict additional example user interfaces that are usable to edit and customize captions using the techniques described herein. For example, a user interface 300 illustrated in FIG. 3A may be presented to the user 102(1) via the computing device 104(1) following the operation 118 of FIG. 1, in which the caption component 116 provides the user 102(1) with the first text caption for editing and customization. The user interface 300 may include a frame 302 of the video that was previously provided by the user 102(1). The user interface 300 may also include a first text caption 304 generated by the caption component 116 and corresponding to speech detected in an audio clip provided by the user 102(1) with the video. The first text caption 304 may be overlaid on the frame 302 of the video in the user interface 300, providing a preview of what text will appear in the automatically-generated caption absent customization or editing by the user 102(1). The user interface 200 may further include an instruction 306 on how to begin editing or customizing the first text caption 304 that was automatically generated by the caption component 116.

Additionally, the first text caption 304 may include a text string 308 inserted into the first text caption 304 by the caption component 116 to obscure a word from a translation of speech in the audio clip. For instance, the speech-to-text component 117 may determine that the speech includes a profane word, and based on this determination, the caption component 116 may replace the profane word with the text string 308 when generating the first text caption 304.

A user interface 310 illustrated in FIG. 3B may be presented to the user 102(1) via the computing device 104(1) in response to the selection of the text string 308 (e.g., via a touch input) included in the first text caption 304 in the user interface 300. The user interface 310 may include the text string 308 absent at least a portion of the first text caption 304, so it is clear to the user 102(1) which portion of the caption the user 102(1) is currently editing or customizing. The user interface 310 may also include a keyboard 312 to facilitate changing characters in the text string 308, deleting the text string 308, replacing the text string 308 with a different text string, and the like, as desired by the user 102(1). Controls to modify the first text caption 304 are not limited to those shown in the user interface 310, and may include timing controls (e.g., to cause the text string 308 to be displayed at a specific time relative to the video and/or the audio clip), font controls, background controls, and the like. As discussed above, user inputs supplied via the user interface 310 may cause the caption component 116 to generate a second text caption based in part on the user inputs, such as changing a character included in the text string 308. In examples, the user interface 310 may include a control 314 that, when selected, causes a content item, which may include the video supplied by the user 102(1), the second text caption that reflects the user inputs received at the user interface 310, and/or the audio clip, to be provided to a second user account on the social networking system 106.

Figure 4B:
FIGS. 4A and 4B depict additional example user interfaces that include captions customized using the techniques described herein.
Figure 4A:
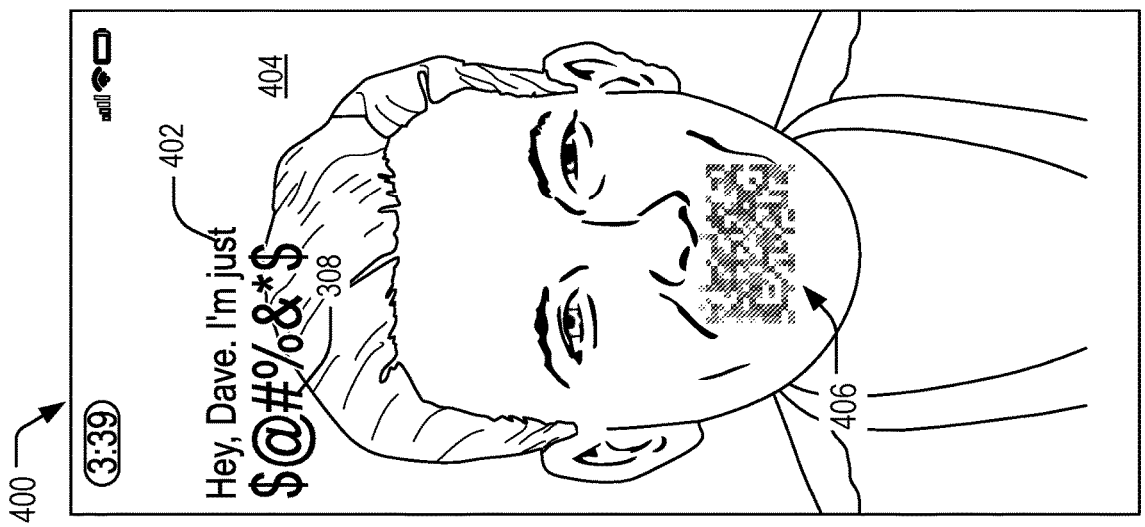

FIGS. 4A and 4B depict additional example user interfaces that include captions customized using the techniques described herein. For example, a user interface 400 illustrated in FIG. 4A may be presented to the user 102(2) via the computing device 104(2) in response to selection of the control 314 (e.g., via a touch input) in the user interface 310. As shown in FIGS. 4A and 4B, the user interface 400 may include a second text caption 402 that includes the text string 308. The caption component 116 may include the text string 308 in the second text caption 402 based at least in part on a confirmation by the user 102(1) to include the text string 308 (e.g., by selection of the control 314), rather than text corresponding to the word (e.g., profanity) spoken by the user 102(1) in the audio clip and/or included in the translation by the speech-to-text component 117.

In examples, the user interface 400 may include a frame 404 of the video presented to the user 102(2) at or near a time at which the word translated from the text string 308 is spoken in the audio clip. This is indicated by the text string 308 being a current output of the second text caption 402, where words (and/or text strings) the second text caption 402 appear as the words (or sounds) occur in the audio clip and/or the video provided by the user 102(1). In some cases, a word or words prior to the text string 308 in the second text caption 402 may be displayed in addition to the word being currently spoken (as shown), such as to provide context on what the user 102(1) is saying in the video. Examples are also considered in which words subsequent to a word currently being spoken are displayed in the second text caption 402.

As discussed above, the caption component 116 may obscure a portion of the frame 404 at or near a time at which the word corresponding to the text string 308 is presented in the second text caption 402. As shown, the caption component 116 has included pixilation 406 of the mouth of the speaker in the frame 404. The caption component 116 may display the pixilation 406 for a time period that the word corresponding to the text string 308 is spoken in the audio clip, and in some cases for additional time before and/or after the word corresponding to the text string 308 is spoken in the audio clip (e.g., +/−0.5 seconds). Additionally, in some examples, the caption component 116 may obscure a portion of the audio clip when the word corresponding to the text string 308 is spoken in the audio clip, and in some cases for additional time before and/or after the word corresponding to the text string 308 is spoken in the audio clip (e.g., +/−0.5 seconds), such as by bleeping, silencing, and the like.

A user interface 408 illustrated in FIG. 4B may be presented to the user 102(2) via the computing device 104(2) subsequent to the user interface 400. For example, the user interface 408 may include a frame 410 of the video that is subsequent to the frame 404. Accordingly, the second text caption 402 in the user interface 408 may include additional words subsequent to the text string 308 which have been spoken in the audio clip following the word corresponding to the text string 308. Because the caption component 116 has determined that the frame 410 does not correspond to a time at which the word corresponding to the text string 308 is being spoken in the audio clip, the caption component 116 may remove the pixilation 406 that was included in the frame 404. Instead, the caption component 116 may display a mouth 412 of a speaker in the frame 410 as included in the video provided by the user 102(1).

Figure 5:
FIG. 5 is an example user interface that is usable to present a notification that includes at least a portion of an edited caption using the techniques described herein.

FIG. 5 is an example user interface 500 that is usable to present a notification which includes at least a portion of an edited caption using the techniques described herein. For example, the user interface 500 may be a lock screen of the computing device 104(1) of FIG. 1, although other interfaces are also considered, such as a home screen, in interface associated with an application on the computing device 104(1) (e.g., an email application, a gaming application, a health application, etc.). The user interface 500 may include a notification 502 to notify the user 102(2) associated with the second user account of receipt of a content item that includes a video and a caption generated using the techniques described herein. In examples, the notification 502 may include at least a portion of a caption received by the second user account in association with a content item. For instance, the caption component 116 may cause at least a portion of the caption included in a content item (e.g., with a video and/or an audio clip) to be included in the notification 502, such as to provide the user 102(2) with a preview of the content included in the content item.

Figure 6:
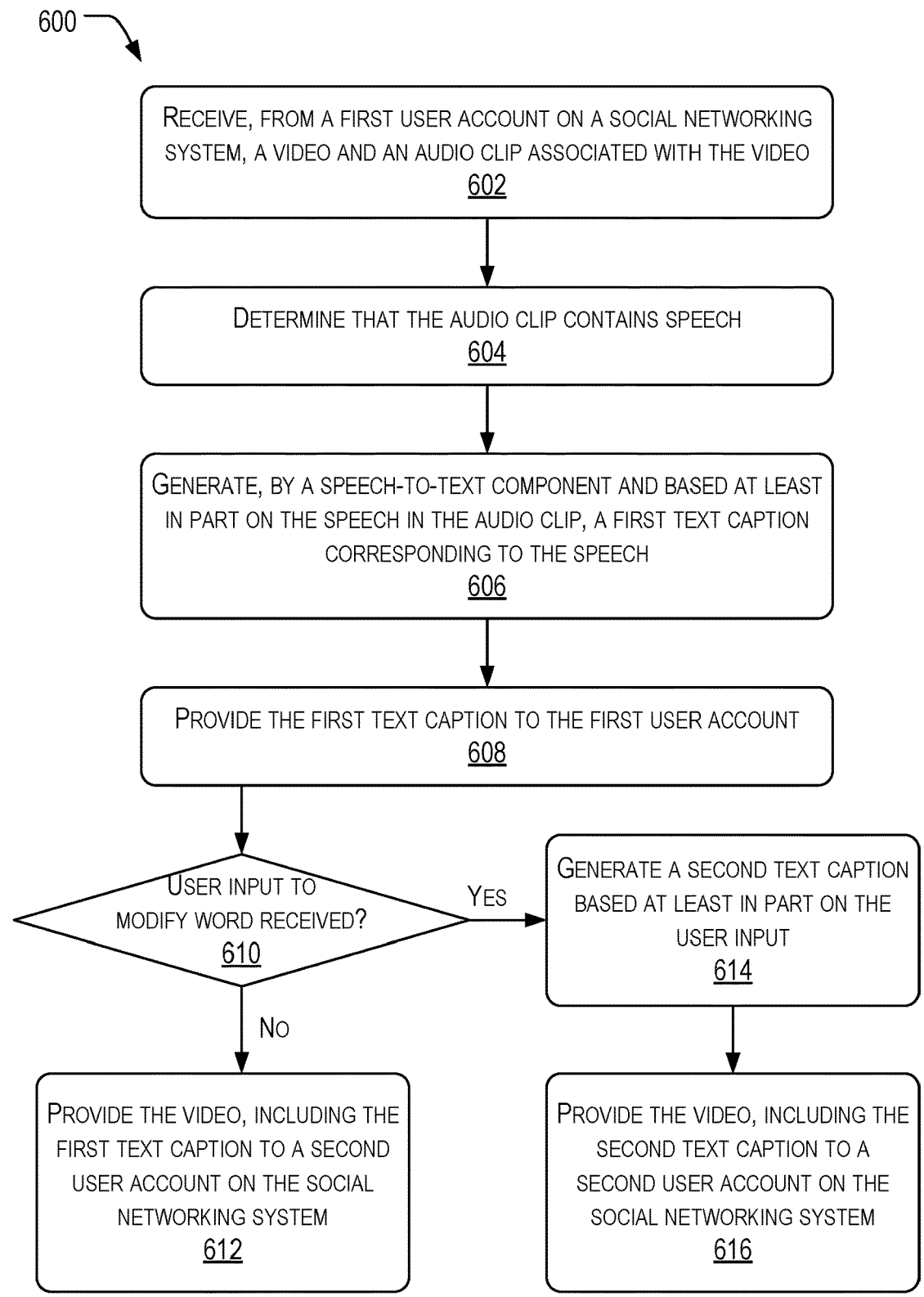
FIG. 6 illustrates a flowchart outlining an example method to generate a caption to be shared on a social networking system using the techniques described herein.

FIG. 6 illustrates an example process 600 for generating a caption to be shared on a social networking system using the techniques described herein. Various methods are described with reference to the example system of FIG. 1 and/or the user interfaces of FIGS. 2-5 for convenience and ease of understanding. However, the methods described are not limited to being performed using the systems of FIG. 1 or FIG. 7 and/or the user interfaces of FIGS. 2-5, and may be implemented using systems and devices other than those described herein.

The method described herein represents a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. In some examples, one or more operations of the method may be omitted entirely. Moreover, the method described herein can be combined in whole or in part with other methods.

An operation 602 includes receiving, from a first user account on a social networking system, a video and an audio clip associated with the video. For example, the social networking system 106 may receive a video and an audio clip associated with the video from a first user account associated with the user 102(1) via the computing device 104(1).

An operation 604 includes determining that the audio clip contains speech. In examples, the speech-to-text component 117 of the caption component may detect speech in the audio clip using voice activity detection (VAD) techniques.

An operation 606 includes generating, by the speech-to-text component 117 and based at least in part on the speech in the audio clip, a first text caption corresponding to the speech. In some examples, the speech-to-text component 117 may generate a transcription of the words in the speech and/or other sounds detected in the audio clip. The caption component 116 may then generate a caption from the transcription, where the caption displays words in the transcription at or near a time corresponding to when words are spoken (or sounds appear) in the audio clip.

An operation 608 includes providing the first text caption to the first user account. In some cases, the caption component 116 may provide the caption to the first user account as a "preview" of how the caption will appear with the video and/or the audio clip once shared on the social networking system 106 with another user account associated with one of the other users 102(2)-102(n). In this way, the user 102(1) can view the content item including the caption that was automatically generated by the caption component 116 with the video and/or audio clip to be shared with another user 102(2), prior to the complete content item being provided to the other user 102(2). The user 102(1) can review the words and/or text included in the automatically-generated caption, a timing of the caption versus the video and/or the audio clip, a location of the caption overlaying the video, and/or a font, a color, a background, and the like of the caption prior to sharing the content item with the user 102(2).

An operation 610 includes determining whether a user input to modify a portion of the caption, such as a word or words in the caption, has been received. In examples, a user input to modify a portion of the caption may include (but is not limited to) changing a spelling of a word (e.g., a letter, character, etc.) included in the automatically-generated caption, changing from one word included by the caption component 116 in the first caption to a different word or words desired by the user 102(1), changing a font and/or a color of the word(s) included in the caption, changing a background color in a space surrounding the word(s) in the caption, and the like.

Upon determining that a user input to modify a portion of the caption is not received (e.g., "No" at operation 610) the process may proceed to operation 612, in which the video, including the first text caption, is provided to a second user account on the social networking system. In other words, the social networking system 106 may provide a content item that may include the video and the automatically-generated first text caption to the second user account without modification, based on an input received from the user 102(1) to share the video and the first text caption. In some cases, the social networking system 106 may also provide, to the second user account, the audio clip from which the first text caption was generated. The social networking system 106 may provide the content item that may include the video and the automatically-generated first text caption to the second user account as a direct message, a feed media content item, a reel media content item (e.g., ephemeral content), and so forth.

Upon detection that a user input to modify a portion of the caption is received (e.g., "Yes" at operation 610) the process may proceed to operation 614, in which a second text caption is generated based at least in part on the user input. In examples, the second text caption may include modifications to the word in the caption such as changing text characters in the word, replacing the word, removing the word, adding the word, confirming replacement of the word by the caption component 116 with a different text string (as described above), changing a time at which the word is displayed in relation to the video and/or audio clip, changing a font of the word, changing a background color in an area surrounding the word, and so forth. In some cases, the caption component 116 may cause the second text caption to overlay the video at the time period corresponding to the speech in the video, and/or at or near a time designated by the user input (e.g., to delay displaying a word in the caption to deliver a punchline of a joke at a particular time). In some examples, the caption component 116 may generate the second text caption with words included in the caption having different formats, such as to emphasize particular words or phrases in the caption.

An operation 616 includes providing the video, including the second text caption, to a second user account on the social networking system. For instance, the social networking system 106 may provide a content item including the video and the second text caption including the modification resulting from the user input to the second user account. In some cases, the social networking system 106 may also provide, to the second user account, the audio clip from which the first text caption was generated. The social networking system 106 may provide the content item including the video and the automatically-generated first text caption to the second user account as a direct message, a feed media, a reel media (e.g., ephemeral content), and so forth.

Example System and Device

Figure 7:
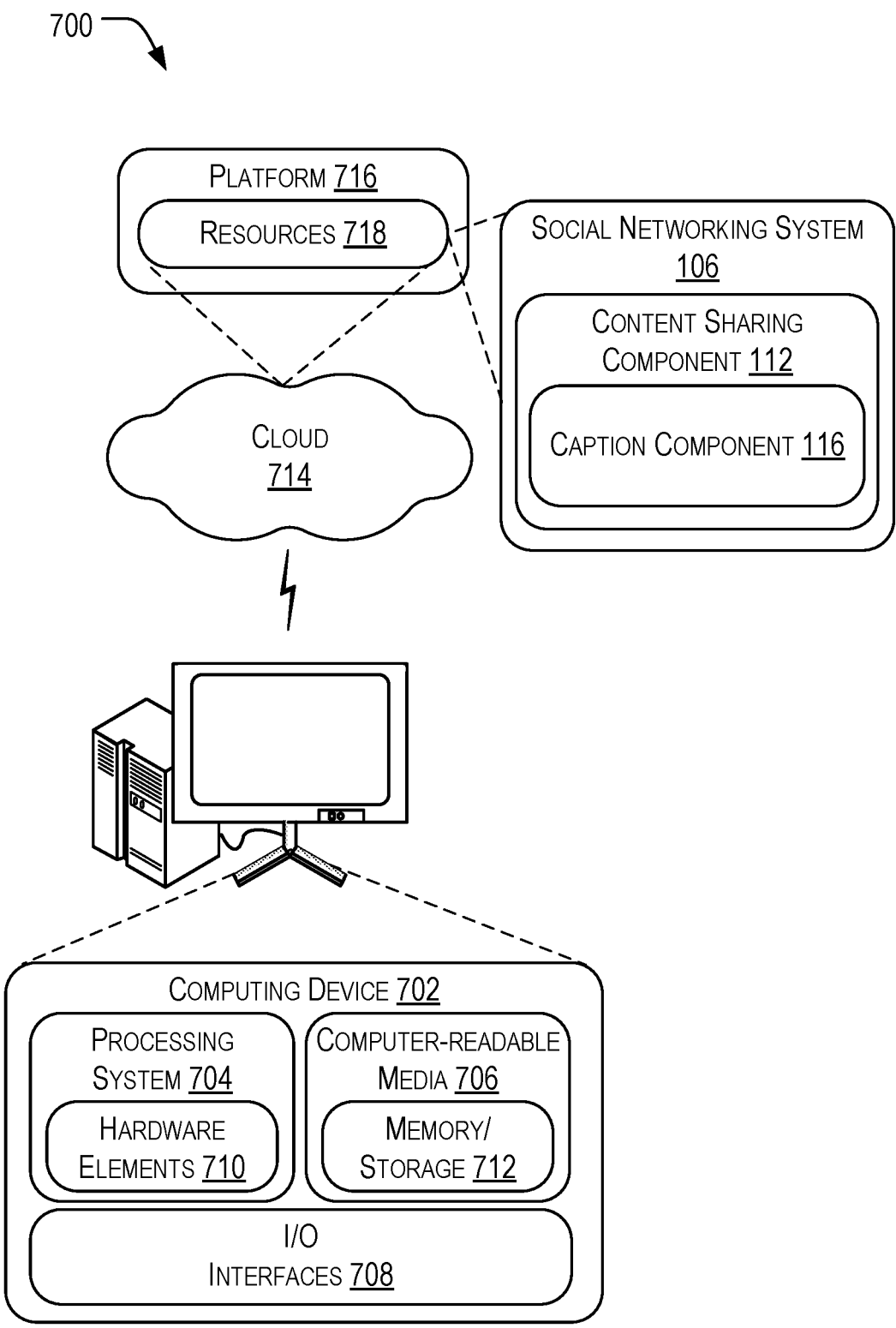
FIG. 7 is an example system and device that is usable to implement the techniques described herein.

FIG. 7 illustrates an example system generally at 700 that includes an example computing device 702 that is representative of one or more computing systems and/or devices that may implement the various techniques described herein. This is illustrated through the inclusion of the content sharing component 112 and the caption component 116. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 706 is illustrated as including memory/storage component 712. The memory/storage component 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "logic," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on and/or transmitted across some form of computer-readable media. The computer-readable media may include a variety of media that may be accessed by the computing device 702. By way of example, and not limitation, computer-readable media may include "computer-readable storage media" and "computer-readable transmission media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer-readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable transmission media" may refer to a medium that is configured to transmit instructions to the hardware of the computing device 702, such as via a network. Computer-readable transmission media typically may transmit computer-readable instructions, data structures, program modules, or other data in a modulated data signal, such as carrier waves, data signals, or other transport mechanism. Computer-readable transmission media also include any information delivery media. The term "modulated data signal" means a signal that has one or more of its characteristics set or changed in such a manner as to encode information in the signal. By way of example, and not limitation, computer-readable transmission media include wired media such as a wired network or direct-wired connection, and wireless media such as acoustic, radio frequency (RF), infrared, and other wireless media.

As previously described, hardware elements 710 and computer-readable media 706 are representative of modules, programmable device logic and/or device logic implemented in a hardware form that may be employed in some examples to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also be scalable to provide a corresponding level of scale to encountered demand for the resources 718 that are implemented via the platform 716. Accordingly, in an interconnected device example, implementation of functionality described herein may be distributed throughout multiple devices of the system 700. For example, the functionality may be implemented in part on the computing device 702 as well as via the platform 716 which may represent a cloud computing environment.

The example systems and methods of the present disclosure overcome various deficiencies of known prior art devices. Other examples of the present disclosure will be apparent to those skilled in the art from consideration of the specification and practice of the disclosure contained herein. It is intended that the specification and examples be considered as example only, with a true scope and spirit of the present disclosure being indicated by the following claims.

CONCLUSION

Although the discussion above sets forth example implementations of the described techniques, other architectures may be used to implement the described functionality, and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. A method comprising:
receiving, from a first user account on a social networking system, a video and an audio clip associated with the video;
determining that the audio clip contains speech;
generating, by a speech-to-text component and based at least in part on the speech in the audio clip, a first text caption corresponding to the speech;
providing the first text caption to the first user account;
receiving, from the first user account, a user input to modify a portion of the first text caption;
generating a second text caption based at least in part on the user input;
providing the video, including the second text caption, to a second user account on the social networking system;

determining that a word included in the transcription is excluded from being output in automatically-generated text captions by the social networking system;
replacing the word in the transcription with a text string that is different from text spelling of the word;
determining a time in the audio clip at which the word is spoken;
determining a portion of a frame of the video depicting a mouth of a person at the time at which the word is spoken in the audio clip; and
obscuring the portion of the frame of the video depicting the mouth of the person at the time at which the word is spoken in the audio clip,
wherein generating the first text caption comprises generating, by the speech-to-text component, a transcription of the speech, and
wherein providing the first text caption to the first user account comprises providing the first text caption with the text string that is different from the text spelling of the word.

2. The method of claim 1, wherein the user input to modify the word included in the first text caption comprises a confirmation to replace the word in the first text caption with the text string that is different from the text spelling of the word.

3. The method of claim 1, further comprising:
altering audio in the audio clip at the time at which the word is spoken to obscure the word in the audio clip; and
providing the audio clip to the second user account.

4. The method of claim 1, wherein the portion of the first text caption comprises a word, and the user input causes a text character included in the word generated by the speech-to-text component to be changed.

5. The method of claim 1, wherein the portion of the first text caption comprises a word, and the user input causes at least one of a font of the word, a color of the word, or a background color in a space surrounding the word to be changed.

6. The method of claim 1, wherein the portion of the first text caption comprises a first word, the method further comprising:
determining a first part of speech of the first word included in the first text caption; and
determining a second part of speech of a second word included in the first text caption,
wherein generating the second text caption comprises displaying the first word in a first format based at least in part on the first part of speech, and displaying the second word in a second format that is different from the first format and based at least in part on the second part of speech.

7. The method of claim 1, wherein the user input to modify the portion of the first text caption causes a timing of display of the portion in the second text caption to be changed relative to the video.

8. The method of claim 1, wherein the portion is a first portion, the method further comprising:
generating a notification that includes at least a second portion of the second text caption; and
providing the notification to the second user account to notify the second user account of receipt of the video.

9. The method of claim 1, wherein the first text caption overlays the video at a time period corresponding to the speech in the video, and
wherein the second text caption overlays the video at the time period corresponding to the speech in the video.

10. A system comprising:
one or more processors; and
one or more computer-readable media storing instructions that, when executed by the one or more processors, cause the system to perform operations comprising:
receiving, from a first user account on a social networking system, a video and an audio clip associated with the video;
determining that the audio clip contains speech;
generating, by a speech-to-text component and based at least in part on the speech in the audio clip, a first text caption corresponding to the speech;
providing the first text caption to the first user account;
receiving, from the first user account, a user input to modify a portion of the first text caption;
generating a second text caption based at least in part on the user input;
providing the video, including the second text caption, to a second user account on the social networking system;
determining that a word included in the transcription is excluded from being output in automatically-generated text captions by the social networking system;
replacing the word in the transcription with a text string that is different from text spelling of the word;
determining a time in the audio clip at which the word is spoken;
determining a portion of a frame of the video depicting a mouth of a person at the time at which the word is spoken in the audio clip; and
obscuring the portion of the frame of the video depicting the mouth of the person at the time at which the word is spoken in the audio clip,
wherein generating the first text caption comprises generating, by the speech-to-text component, a transcription of the speech, and
wherein providing the first text caption to the first user account comprises providing the first text caption with the text string that is different from the text spelling of the word.

11. The system of claim 10, wherein the user input to modify the word included in the first text caption comprises a confirmation to replace the word in the first text caption with the text string that is different from the text spelling of the word.

12. The system of claim 10, further comprising:
altering audio in the audio clip at the time at which the word is spoken to obscure the word in the audio clip; and
providing the audio clip to the second user account.

13. One or more computer-readable storage media storing instructions that, when executed by one or more processors, perform operations comprising:
receiving, from a first user account on a social networking system, a video and an audio clip associated with the video;
determining that the audio clip contains speech;
generating, by a speech-to-text component and based at least in part on the speech in the audio clip, a first text caption corresponding to the speech;
providing the first text caption to the first user account;
receiving, from the first user account, a user input to modify a portion of the first text caption;
generating a second text caption based at least in part on the user input;
providing the video, including the second text caption, to a second user account on the social networking system;

determining that a word included in the transcription is excluded from being output in automatically-generated text captions by the social networking system;

replacing the word in the transcription with a text string that is different from text spelling of the word;

determining a time in the audio clip at which the word is spoken;

determining a portion of a frame of the video depicting a mouth of a person at the time at which the word is spoken in the audio clip; and obscuring the portion of the frame of the video depicting the mouth of the person at the time at which the word is spoken in the audio clip, wherein generating the first text caption comprises generating, by the speech-to-text component, a transcription of the speech, and wherein providing the first text caption to the first user account comprises providing the first text caption with the text string that is different from the text spelling of the word.

14. The one or more computer-readable storage media of claim 13, wherein the portion of the first text caption comprises a first word, the operations further comprising:

determining a first part of speech of the first word included in the first text caption; and determining a second part of speech of a second word included in the first text caption, wherein generating the second text caption comprises displaying the first word in a first format based at least in part on the first part of speech, and displaying the second word in a second format that is different from the first format and based at least in part on the second part of speech.

15. The one or more computer-readable storage media of claim 13, wherein the portion is a first portion, the operations further comprising:

generating a notification that includes at least a second portion of the second text caption; and providing the notification to the second user account to notify the second user account of receipt of the video.

16. The one or more computer-readable storage media of claim 13, wherein the first text caption overlays the video at a time period corresponding to the speech in the video, and wherein the second text caption overlays the video at the time period corresponding to the speech in the video.

17. The system of claim 10, wherein the portion of the first text caption comprises a first word, the method further comprising:

determining a first part of speech of the first word included in the first text caption; and determining a second part of speech of a second word included in the first text caption, wherein generating the second text caption comprises displaying the first word in a first format based at least in part on the first part of speech, and displaying the second word in a second format that is different from the first format and based at least in part on the second part of speech.

18. The system of claim 10, wherein the user input to modify the portion of the first text caption causes a timing of display of the portion in the second text caption to be changed relative to the video.

19. The one or more computer-readable storage media of claim 13, wherein the portion of the first text caption comprises a word, and the user input causes a text character included in the word generated by the speech-to-text component to be changed.

20. The one or more computer-readable storage media of claim 13, wherein the portion of the first text caption comprises a word, and the user input causes at least one of a font of the word, a color of the word, or a background color in a space surrounding the word to be changed.

\* \* \* \* \*